United States Patent [19]
Mansour et al.

[11] Patent Number: 5,278,386
[45] Date of Patent: Jan. 11, 1994

[54] SYSTEM AND METHOD FOR SELECTIVELY MACHINING A D.C. MOTOR

[75] Inventors: Tahir M. Mansour, Livonia; Harvey W. Krage, Ypsilanti, both of Mich.

[73] Assignee: Ford Motor Company, Dearborn, Mich.

[21] Appl. No.: 947,637

[22] Filed: Sep. 21, 1992

[51] Int. Cl.$^5$ .............................................. B23K 26/14
[52] U.S. Cl. ........................... 219/121.68; 219/121.74; 219/121.8
[58] Field of Search ........... 219/121.8, 121.74, 121.68, 219/121.69

[56] References Cited

U.S. PATENT DOCUMENTS

| | | | |
|---|---|---|---|
| 3,388,314 | 6/1968 | Gould | 321/69 |
| 4,329,564 | 5/1982 | Hazelton et al. | 219/121 LJ |
| 4,339,655 | 7/1982 | Lauroeach | 219/121 LJ |
| 4,417,124 | 11/1983 | Benedite et al. | 219/121 LH |

Primary Examiner—C. L. Albritton
Attorney, Agent, or Firm—Paul K. Godwin; Roger L. May

[57] ABSTRACT

Apparatus and method for undercutting the insulation material below the surface of adjacent commutator bars on the armature of a direct current motor. A focused laser beam is directed substantially normal to the commutator surface. The beam can be delivered to the surface of the commutator by several different beam focusing and shaping technologies. The high energy beam is scanned over the surface as the armature is held in a fixture and allowed to rotate about its axis to cause the ablation of a predetermined amount of insulative material from between the commutator bars. A high pressure air nozzle is directed at the surface of the armature to remove particles ablated from the surface of the armature by the process.

19 Claims, 2 Drawing Sheets

SYSTEM AND METHOD FOR SELECTIVELY MACHINING A D.C. MOTOR

BACKGROUND OF THE INVENTION

1. Field of the Invention

The present invention is directed to the field of D.C. motor manufacturing and more specifically to the area of machining the commutator portion of such motors.

2. Description of the Prior Art

Both mechanical and laser machining processes have been used to undercut insulative material from the area between commutator bars of a D.C. motor armature. Mechanical systems involve friction grinding and removal of the insulation. These systems are relatively slow and require periodic maintenance or replacement of the grinding tool. While laser ablating systems hold great promise for lowering the costs of performing the insulation removal step in the motor manufacturing process, prior art systems appear to be inefficient.

U.S. Pat. No. 4,329,564 discloses a method for laser undercutting the insulation between commutator bars. In that patent, the armature is mounted on a motor driven x-y table for movement and high speed rotation of the armature with respect to a fixed laser beam. The beam is focused a distance above the surface and the angle of incidence is at a significant angle with respect to the perpendicular of the surface of the armature so that the incident beam is wide enough to impinge on both the insulative dielectric and the adjacent commutator bar.

There is a great need to overcome the complicated and costly x-y type table configuration shown in the prior art and to provide a low maintenance, high speed alternative in order to achieve efficiencies suitable for use in a high volume manufacturing process.

SUMMARY OF THE INVENTION

The present invention overcomes the deficiencies in the prior art by employing a means to direct a focused beam of high intensity radiation in a line that is parallel to the axis of the armature to melt or vaporize the insulating material while rotating the armature. This eliminates the need for a device that produces x-y movement of the armature during the ablation process.

In two embodiments of the present invention, the beam is focused onto the surface of the commutator and caused to scan in a linear direction that is parallel to the axis of the rotating armature. In a third embodiment, the beam is focused as a fixed line onto the surface of the commutator while the armature is caused to rotate.

In the axial beam scanning embodiments, the beam is focused as a spot on the armature surface and scanned in a controlled manner with respect to the armature rotation speed, such that for each armature rotation, there is a degree of overlap between the previously ablated section and the newly ablated section. The process can be controlled with beam modulation, scanning speed and rotation speed to undercut the commutator bars to a desired depth depending on the physical properties of the insulating material.

According to the present invention, a high intensity radiation beam is used in an undercutting system for the removal of the insulating material between commutator bars of a D.C. motor armature. The system comprises a fixture that includes a high intensity radiation beam generator; a means for manipulating the output of the high intensity radiation beam generator so as to direct the high intensity radiation beam to the commutator surface in a direction which is substantially normal to said commutator surface; and a means for holding the armature in a fixed location and means for rotating the armature about its axis.

DETAILED DESCRIPTION OF THE INVENTION

Figure 1:
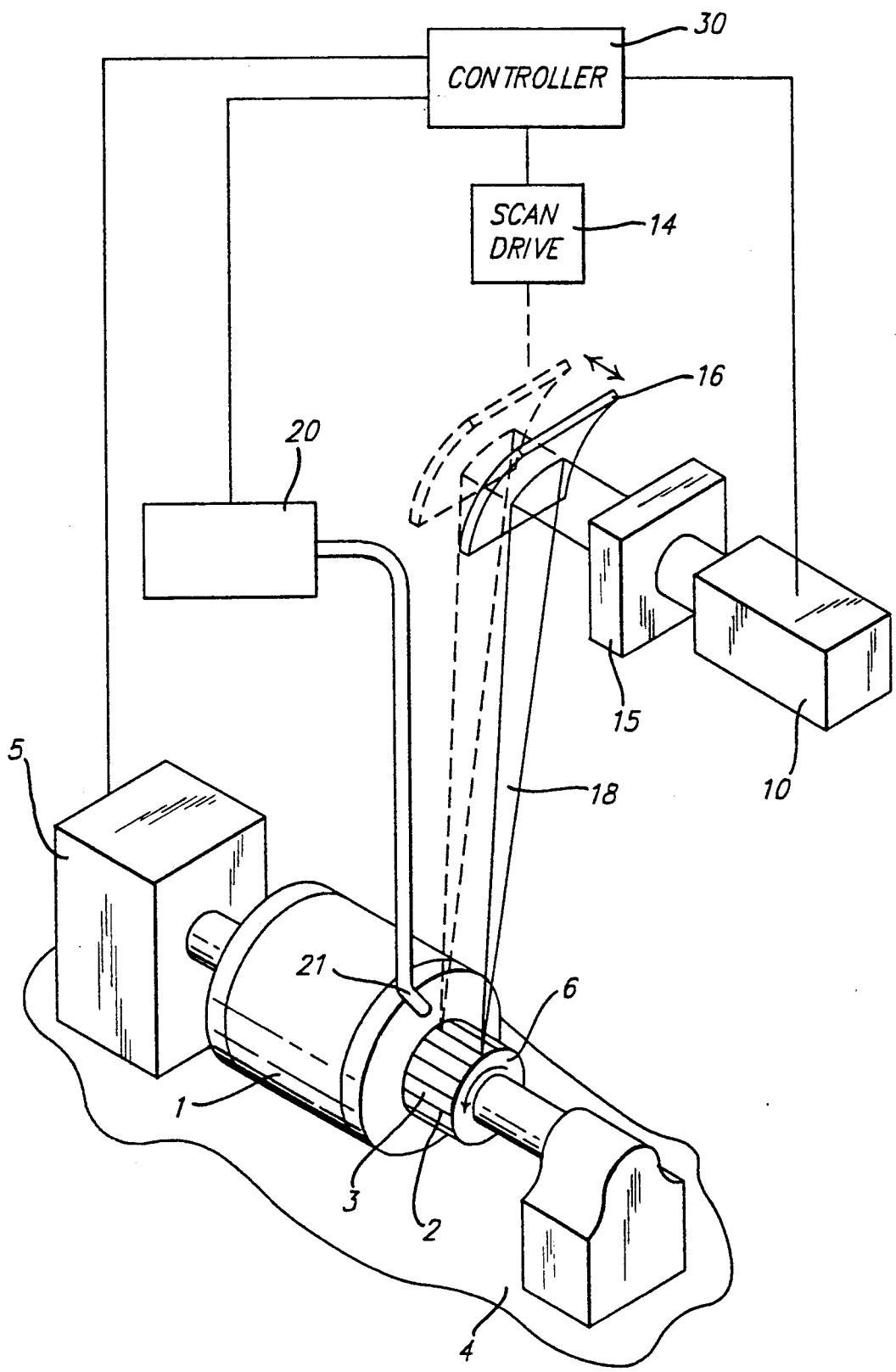
FIG. 1 is a perspective view of the preferred embodiment of the present invention.

In FIG. 1, an armature 1 for a D.C. motor is shown mounted on a lathe-like fixture 4. A motor 5 is mounted to the fixture 4 and is used to rotate the armature 1 in the fixture 4 at a constant speed. The armature contains a commutator portion 6 that comprises a plurality of electrically conducting commutator bars 3 separated by molded insulating strips of dielectric material 2. The insulating strips are formed of a plastic material, commonly a phenolic. The commutator bars 3 are formed of an electrical conductor such as copper.

A laser generator 10 provides a high intensity beam output that passes through beam shaping optics 15 to a parabolic mirror 16 which is located at a predetermined distance from the surface of the commutator portion 6. The laser used in this embodiment is a $CO_2$ laser with a wavelength of 10.6 microns. Other high energy beam sources of radiation could be used. The radiation output by the beam shaping optics 15 is then reflected from the parabolic mirror 16 and focused onto the surface of the commutator 6. The reciprocating movement of the parabolic mirror 16 is controlled by the scan drive 14 in a linear direction parallel to the axis of rotation of the armature 1. The distance the scan drive 14 moves the parabolic mirror 16 corresponds to the length of insulation to be removed from between commutator bars. This is generally dictated by the predicted contact path that a set of brushes will make along the surface of the commutator 6 when the motor armature 1 is assembled in a motor and is operating. The laser beam is directed just off normal to the surface of the commutator 6 to prevent the reflection of light back into the laser generator 10.

In operation the beam energy is absorbed by the insulating strips 2 and reflected by the commutator bars 3, resulting in the ablation of only the insulative material. A high pressure air supply 20 is directed to the surface of the commutator 6 through nozzle 21. The nozzle 21 directs the high pressure air at the commutator surface to carry away the insulation material ablated by the focused beam. An effective orientation of the nozzle 21 occurs when it is directed along a line parallel to the axis of armature rotation to carry ablated material from the surface of the commutator 6 and away from the armature 1.

The controller 30 is used to coordinate the operation of the high pressure air supply 20, the motor 5 used to rotate the armature 1, the scan drive 14, and the excitation of the laser generator 10. The controller 30 can be a microprocessor based device programmed to provide the separate steps necessary to perform the ablating process in a repetitive manner. The controller 30 synchronizes the beam generation with the speed control operation of the scan drive 14 to control the scan speed of the mirror 16 to thereby provide and control the movement of the high intensity beam 18. The scan speed is dependent on the controlled speed of the motor 5 to achieve the proper desired undercut depth of the insulating strips 2 as the armature is rotated. The controller 30 also activates the air supply 20 to remove the ablated particles from the surface of the commutator 6. In this embodiment, the beam preferrably traces an overlapping spherical pattern over the length of the commutator 6 in order to ensure that the commutator bars 3 are undercut to a point where no insulating material remains above the surface of the commutator bars 3 that would effect the brushes as they slide over the commutator bars when the armature is used in an assembled motor. Using the laser noted above, an undercut path ⅛ inch in length and 0.03 inch below the surface of the commutator bars 3 has been achieved in less than 5 seconds while the armature was rotated at approximately 2000 rpm.

Figure 2:
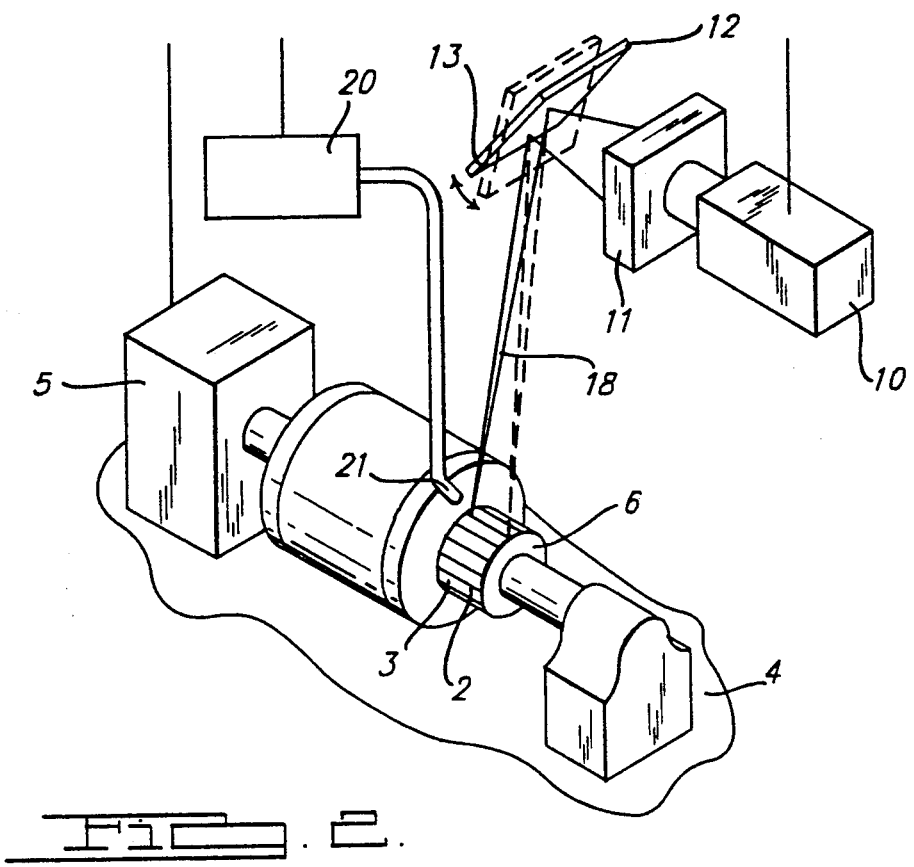
FIG. 2 is a perspective view of an alternative embodiment of the present invention.

Referring to FIG. 2, the beam scanning portion is altered from the embodiment of FIG. 1. In this embodiment the laser beam generator 10 emits a high intensity beam 18 which is directed at the beam shaping optics 11. The optics 11 shape the beam in a desired manner to focus the beam 18 to a predetermined spot size on the surface of the commutator of the armature 1. After leaving the optic device 11, the high intensity beam 18 is reflected to the surface of the commutator 3 by a planar mirror scanner 12. The planar mirror 12 pivots about a transverse axis 13 so as to sweep the beam 18 in a linear path on the surface of the commutator 6, in parallel to the armature axis of rotation. A controller (not shown but similar to that described in conjunction with FIG. 1) is used to synchronize the beam generation, beam movement and armature rotation as in the first embodiment.

Figure 3:
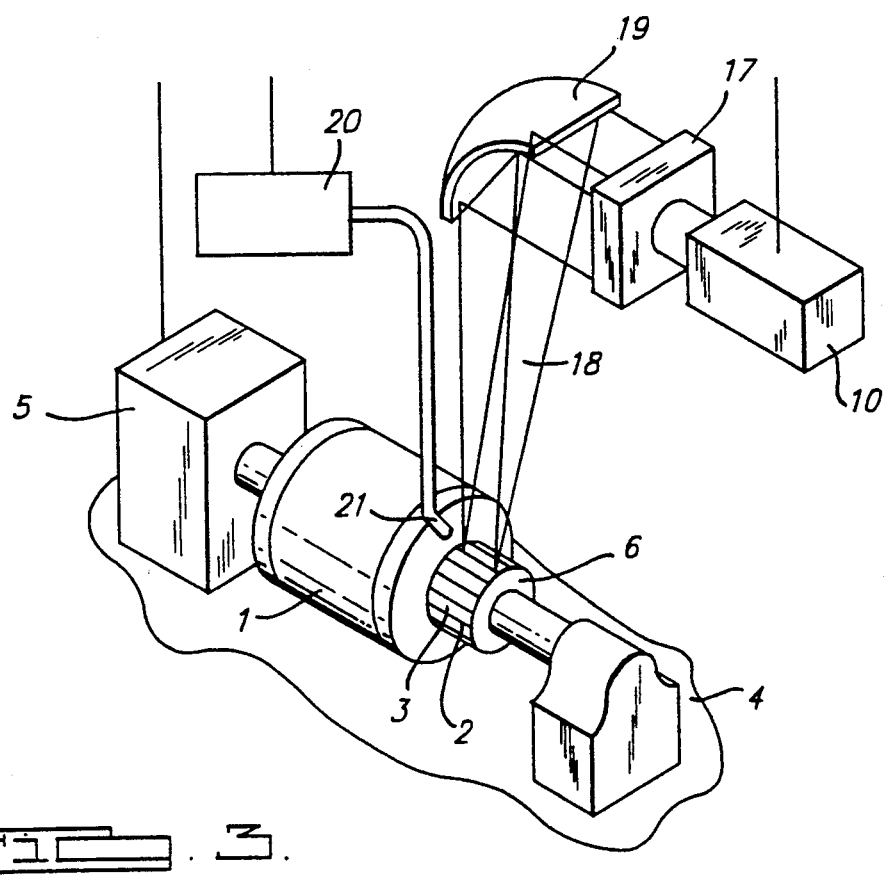
FIG. 3 is a perspective view of another alternative embodiment of the present invention.

Referring to FIG. 3, an embodiment is shown in which the high intensity beam 18 from the laser 10 is passed through beam shaping optics 17 to a line shaping mirror 19. The line shaping mirror 19 is geometrically configured so as to reflect and focus the high intensity beam 18 to the surface of the commutator 6. The high intensity beam 18 is focused by the line shaping mirror 19 to a line of energy, whose length corresponds to the length of the insulation path desired to be ablated from the surface of the commutator 6. The line of energy is parallel to the axis of rotation of the armature 1. To prevent reflection of the high intensity beam back into itself, the angle of incidence of the focused beam upon the surface of the armature is at a slight angle with respect to the normal.

In this embodiment, a controller (not shown, but similar to that described in conjunction with FIG. 1) synchronizes the generation of the beam with the rotation of the armature and operation of the air supply. Since the beam is held in a fixed location and the line of energy is scanned over the commutator by the rotation of the armature the complexity of the system is reduced.

The present invention may be incorporated as part of a manufacturing process where the armature may be manually or automatically placed into a lathe-like fixture or a plurality of lathe like fixtures that may be indexed into position with respect to the high energy beam for ablating.

We claim:

1. An apparatus for removing a predetermined portion of insulative material from between commutator bars of a commutator on an armature of a motor comprising;
   a high intensity radiation beam generator for outputting a beam of energy sufficient intensity to at least melt the insulative material;
   means for manipulating the output of said high intensity radiation beam generator so as to direct the high intensity radiation beam to the commutator surface in a direction which is substantially normal to said commutator surface; and
   means for holding the armature in a fixed location and means for rotating the armature about its axis.

2. An apparatus as in claim 1, whereby said means for manipulating the high intensity radiation beam comprises:
   a parabolic mirror for reflectively focusing said beam onto said commutator surface; and
   drive means connected to said mirror to move said focused beam in a line along the surface of said commutator.

3. An apparatus as in claim 2, further including:
   means for controlling the depth of insulative material melted by coordinating the operation of the generator, the manipulating means and the holding and rotating means.

4. An apparatus as in claim 3, further including means for removing said melted insulative material from said commutator.

5. An apparatus as in claim 4, wherein said controlling means also controls the operation of said removing means.

6. An apparatus as in claim 1, wherein said means for manipulating the high intensity radiation beam comprises:
   means for focusing said beam to a predetermined point;
   a planar mirror pivotally attached to a drive means for movement about an axis;
   drive means for moving said planar mirror to reflect and scan said focused beam over a line on the surface of the commutator.

7. An apparatus as in claim 6, further including:
   means for controlling the depth of insulative material melted by coordinating the operation of the generator, the manipulating means and the holding and rotating means.

8. An apparatus as in claim 7, further including means for removing said melted insulative material from said commutator.

9. An apparatus as in claim 8, wherein said controlling means also controls the operation of said removing means.

10. An apparatus as in claim 1, whereby said means for manipulating the high intensity radiation beam comprises;
    a mirror means configured to focus the output of the beam into a line on the surface of the commutator.

11. An apparatus as in claim 10, whereby
    said line having a length that corresponds to the width of the path of insulation to be removed; and
    said line being focused in a direction parallel to the axis of rotation substantially normal to the surface of said commutator.

12. An apparatus as in claim 11, further including:
    means for controlling the depth of insulative material melted by coordinating the operation of the generator, the manipulating means and the holding and rotating means.

13. An apparatus as in claim 12, further including means for removing said melted insulative material from said commutator.

14. An apparatus as in claim 13, wherein said controlling means also controls the operation of said removing means.

15. An apparatus as in claim 4 wherein said removing means includes a high pressure air supply nozzle directed at the area where the insulation is melted such that when applied, the air pressure removes the melted insulation particles from the commutator surface.

16. A method of ablating a predetermined amount of insulative material from between commutator bars of a motor armature comprising the steps of:
   locating said commutator in a relatively fixed position;
   rotating the commutator at a predetermined speed;
   providing a source of high intensity radiation;
   focusing a high intensity beam from said radiation source onto the surface of said rotating commutator;
   scanning said focused beam over said commutator surface while rotating in its fixed position and ablating said insulative material.

17. A method as in claim 16, wherein said steps of focusing and directing said beam are performed by a relatively fixed optical mirror which focuses said beam in a line on the surface of said commutator parallel with the axis of commutator rotation.

18. A method as in claim 16, wherein said step of directing said focused beam is performed by a pivotally mounted planar mirror which is controlled to scan the beam in a direction parallel to the axis of commutator rotation.

19. A method as in claim 16, wherein said steps of focusing and directing said beam are performed by a linearly driven optical mirror which focuses said beam to a point on the surface of said commutator and scans said beam in a direction parallel to the axis of commutator rotation.

* * * * *